(No Model.)
E. SANDERS.
CAN OPENER.
No. 584,121.  Patented June 8, 1897.
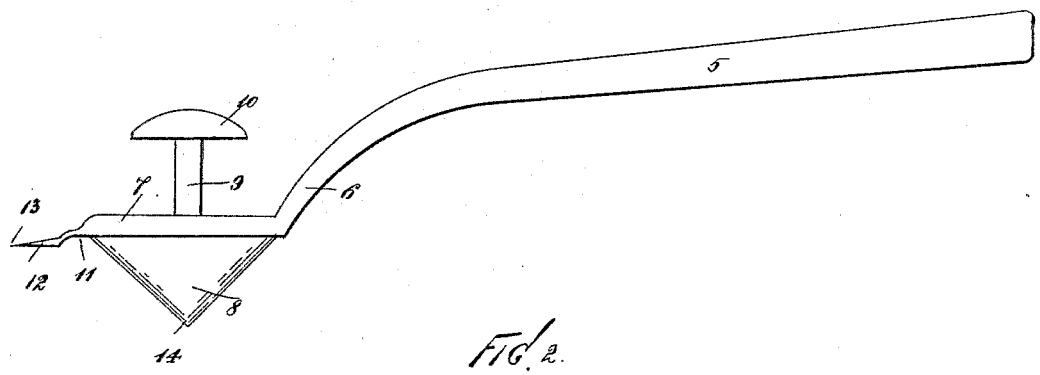
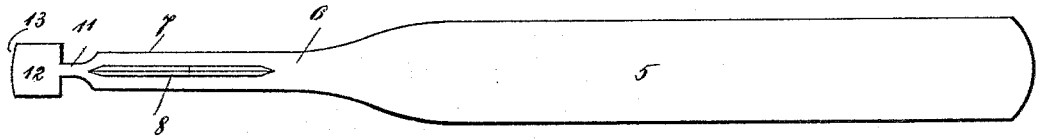
WITNESSES
John Buckler,
C. Gerst
INVENTOR
Ezra Sanders
BY
Edgar Tate & Co
ATTORNEYS

UNITED STATES PATENT OFFICE.

EZRA SANDERS, OF MONTE VISTA, COLORADO.

CAN-OPENER.

SPECIFICATION forming part of Letters Patent No. 584,121, dated June 8, 1897.

Application filed December 28, 1896. Serial No. 617,208. (No model.)

*To all whom it may concern:*

Be it known that I, EZRA SANDERS, a citizen of the United States, residing at Monte Vista, in the county of Rio Grande and State of Colorado, have invented certain new and useful Improvements in Can-Openers, of which the following is a full and complete specification, such as will enable those skilled in the art to which it appertains to make and use the same.

This invention relates to can-openers; and the object thereof is to provide an improved device of this class which is simple in construction and operation and which is comparatively inexpensive, and by means of which the head of a can of any size may be quickly and easily cut out.

The invention is fully disclosed in the following specification, of which the accompanying drawings form a part, in which—

Figure 1 is a side view of my improved can-opener, and Fig. 2 a bottom plan view thereof.

In the drawings forming part of this specification the separate parts of my improvement are designated by numerals of reference throughout the several views, and in the practice of my invention I provide a can-opener which comprises a handle 5, which is provided at one end with a downwardly-curved shank 6, said shank being provided with an extension or head 7, which projects in the same plane with the handle 5 and which is oblong in form, and to the bottom of which is secured or on the bottom of which is formed a downwardly-directed triangular plate 8, the lower point of which is directly under the central portion of the head or extension 7.

The head or extension 7 is provided centrally of the top thereof with a standard 9, on the upper end of which is formed a knob 10, and said head or extension 7 is provided at its outer end with a downwardly and outwardly curved neck or projection 11, on the outer end of which is formed a blade or head 12, which is preferably rectangular in form and provided with an edge 13.

The operation will be readily understood from the foregoing description when taken in connection with the accompanying drawings and the following statement thereof.

In practice the point 14 of the blade is driven through the head of the can near the perimeter thereof by striking on the knob 10 of the standard 9, and the hole thus made is made large enough to receive the blade or head 12, and said blade or head 12 is then inserted through said opening, and the handle is turned until the neck or projection 11 is transverse of said cut, with the head or blade 12 beneath the head of the can, and then by shoving forward on the handle and by moving the same up and down, the handle being used as a lever and the neck or projection 11 as a pivot, the entire head of the can may be quickly and easily cut out, it being understood that the blade 8 is moved entirely around the head of the can as the cutting progresses.

This device is simple in construction and operation and perfectly adapted to accomplish the result for which it is intended, and is comparatively inexpensive.

Having fully described my invention, I claim as new and desire to secure by Letters Patent—

The herein-described can-opener, which comprises a handle as 5, which is provided with a downwardly-curved shank as 6, a head or extension as 7, the bottom of which is provided with a depending triangular blade, said head or extension being provided at its outer end with a downwardly-curved neck or projection, at the end of which is a curved head or blade, and said head or extension being also provided centrally of the top thereof with a standard having a knob at its upper end, substantially as shown and described.

In testimony that I claim the foregoing as my invention I have signed my name, in presence of the subscribing witnesses, this 22d day of December, 1896.

EZRA SANDERS.

Witnesses:
WILLIAM H. DRENING,
FERDINAND BORCHERT.